US012576848B2

(12) United States Patent
Booth et al.

(10) Patent No.:  US 12,576,848 B2
(45) Date of Patent:     Mar. 17, 2026

(54) METHOD AND SYSTEM WITH SELECTABLE MULTIMODE CONTROL OF REGENERATIVE BRAKING TORQUE LIMITATION

(71) Applicant: Cummins Inc., Columbus, IN (US)

(72) Inventors: Richard A. Booth, Columbus, IN (US); Jaime A. Lugo-Castillo, Unionville, IN (US); Sathya Narayanan Hariharan, Columbus, IN (US); Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 149 days.

(21) Appl. No.: 18/290,526

(22) PCT Filed: May 20, 2022

(86) PCT No.: PCT/US2022/030333
§ 371 (c)(1),
(2) Date: Nov. 14, 2023

(87) PCT Pub. No.: WO2022/251072
PCT Pub. Date: Dec. 1, 2022

(65) Prior Publication Data
US 2024/0253635 A1      Aug. 1, 2024

Related U.S. Application Data

(60) Provisional application No. 63/193,368, filed on May 26, 2021.

(51) Int. Cl.
B60W 30/18 (2012.01)
B60W 10/08 (2006.01)
(Continued)

(52) U.S. Cl.
CPC ...... B60W 30/18127 (2013.01); B60W 10/08 (2013.01); B60W 30/182 (2013.01);
(Continued)

(58) Field of Classification Search
CPC ........... B60W 30/18127; B60W 10/08; B60W 30/182; B60W 50/082; B60W 2050/0063;
(Continued)

(56) References Cited

U.S. PATENT DOCUMENTS 8,718,852 B2    5/2014   Weng et al.
10,363,822 B2    7/2019   Park
(Continued)

OTHER PUBLICATIONS

Supplementary European Search Report and Written Opinion for EP 22811896.4, mailed Mar. 13, 2025.
(Continued)

*Primary Examiner* — Brian P Sweeney
(74) *Attorney, Agent, or Firm* — Faegre Drinker Biddle & Reath LLP

(57)               ABSTRACT

Methods, apparatuses, and systems for controlling regenerative braking of a vehicle are disclosed. A user interface facilitates a user to provide an input to select an operating mode for the vehicle, the operating mode selected from one of selectable modes comprising: (i) manually controlled regenerative braking mode and (ii) automatically controlled regenerative braking mode. When the (i) mode is selected, the controller applies a scaling factor to the regenerative torque capability curve of the vehicle based on additional
(Continued)

user input. When the (ii) mode is selected, the controller automatically applies the scaling factor based on one or more traction control events and environmental factors.

20 Claims, 5 Drawing Sheets

(51) Int. Cl.
　　*B60W 30/182*　　　(2020.01)
　　*B60W 50/00*　　　 (2006.01)
　　*B60W 50/08*　　　 (2020.01)
　　*H04W 4/40*　　　　(2018.01)
(52) U.S. Cl.
　　CPC ............ *B60W 50/082* (2013.01); *H04W 4/40*
　　　　(2018.02); *B60W 2050/0063* (2013.01); *B60W*
　　　　*2540/10* (2013.01); *B60W 2540/12* (2013.01);
　　　　　　*B60W 2540/215* (2020.02); *B60W 2556/45*
　　　　　　　　　　　　　　　　　　　　　　(2020.02)
(58) Field of Classification Search
　　CPC ......... B60W 2540/10; B60W 2540/12; B60W
　　　　2540/215; B60W 2556/45; H04W 4/40;
　　　　B60L 2240/14; B60L 2240/423; B60L
　　　　2250/12; B60L 2250/26; B60L 2250/28;
　　　　B60L 2260/46; B60L 3/108; B60L 7/18;
　　　　　　　　　　　　　　　　B60L 15/2009
　　See application file for complete search history.

(56) References Cited

U.S. PATENT DOCUMENTS

| | | | |
|---|---|---|---|
| 10,377,242 B2 * | 8/2019 | Murase | .............. B60L 15/2045 |
| 2004/0207350 A1 * | 10/2004 | Wilton | ................... B60L 3/102 |
| | | | 318/376 |
| 2011/0088658 A1 | 4/2011 | Chan | |
| 2015/0019058 A1 | 1/2015 | Georgiev | |
| 2016/0107539 A1 | 4/2016 | Cox | |
| 2016/0121963 A1 | 5/2016 | Tanaka et al. | |
| 2016/0325732 A1 | 11/2016 | Yang et al. | |
| 2019/0184805 A1 | 6/2019 | Yan et al. | |
| 2021/0122371 A1 | 4/2021 | Choi | |

OTHER PUBLICATIONS

International Search Report and Written Opinion for International patent application No. PCT/US2022/030333 filed May 20, 2022, mailed Sep. 1, 2022.
Tao et al., "A Regenerative Braking System for Electric Vehicle with Four In-wheel Motors Based on Fuzzy Control," IEEE, date of publications, retrieved on Aug. 4, 2022. Retrieved from the Internet <URL: https://ieeexplore.ieee.org/stamp/stamp.jsp?tp=&arnumber= 8028032> entire document.
International Preliminary Report on Patentability received for PCT Patent Application No. PCT/US2022/030333, mailed on Dec. 7, 2023, 7 pages.

* cited by examiner

METHOD AND SYSTEM WITH SELECTABLE MULTIMODE CONTROL OF REGENERATIVE BRAKING TORQUE LIMITATION

CROSS-REFERENCE TO RELATED APPLICATIONS

This application claims priority to and is a U.S. national stage application of International Patent Application No. PCT/US2022/030333, filed May 20, 2022, which claims priority to U.S. Provisional Application No. 63/193,368, filed on May 26, 2021, the disclosures of which are hereby incorporated herein by reference in their entirety.

FIELD OF THE DISCLOSURE

The present disclosure relates generally to electrically powered vehicles, especially to improving control of regenerative braking for such vehicles.

BACKGROUND OF THE DISCLOSURE

Environmental concerns and limited natural resources are highlighting the desire for reduced fuel consumption. One promising avenue toward the reduction of fuel consumption is the use of hybrid and electric powertrains. Such powertrains utilize regenerative braking to increase the overall efficiency of the system. Regenerative braking provides negative torque to the driveline and recovers kinetic energy from a moving vehicle, which is stored as electrical potential energy. Vehicles may also include other types of braking systems that create negative torque, such as compression release braking and exhaust braking, and accelerator pedals to initiate commands for positive torque. However, the regenerative braking as typically implemented in hybrid or fully electric vehicles lacks the flexibility to accommodate for different driving conditions. Therefore, further technological developments are desirable in this area.

SUMMARY OF THE DISCLOSURE

Various embodiments of the present disclosure relate to methods, apparatuses, and systems to control regenerative braking of a vehicle. In some examples, the apparatus includes a user interface to facilitate a user to provide an input to select an operating mode for the vehicle. The operating mode is selected from one of the following selectable modes including: (i) manually controlled regenerative braking mode and (ii) automatically controlled regenerative braking mode. The apparatus also includes a controller coupled with the user interface. The controller receives from the user interface the input to determine the operating mode that is selected. Responsive to determining that the (i) manually controlled regenerative braking mode is selected, the controller applies a scaling factor to a regenerative torque capability curve of the vehicle based on additional user input. Then, responsive to determining that the (ii) automatically controlled regenerative braking mode is selected, the controller automatically applies the scaling factor to the regenerative torque capability curve of the vehicle based on one or more traction control events and environmental factors.

In some examples, the selectable modes further include: (iii) maximum regenerative braking mode and (iv) minimum regenerative braking mode. Responsive to determining that the (iii) maximum regenerative braking mode is selected, the controller enables maximum regenerative torque capability for the vehicle as defined by the regenerative torque capability curve of the vehicle. Responsive to determining that the (iv) minimum regenerative braking mode is selected, the controller enables minimum regenerative torque capability for the vehicle.

In some examples, the additional user input includes accelerator pedal actuation and brake pedal actuation by the user. Responsive to determining that the (i) manually controlled regenerative braking mode is selected, in some examples, the controller reduces effect of the accelerator pedal actuation in determining the scaling factor, determines the scaling factor based on the brake pedal actuation, and applies the scaling factor to the regenerative torque capability curve of the vehicle. In some examples, the scaling factor corresponds to a position of a brake pedal as determined by a position sensor coupled with the brake pedal. In some examples, the scaling factor is proportional to a force or pressure applied to a brake pedal as determined by a force or pressure sensor coupled with the brake pedal. In some examples, the minimum regenerative torque capability is defined as when a regenerative torque is disabled.

In some examples, the scaling factor is selected from a range of from about 5% to about 95%, a range of from about 10% to about 90%, or a range of from about 15% to about 85%. In some examples, responsive to determining that the (ii) automatically controlled regenerative braking mode is selected, the controller implements machine learning to determine the scaling factor based on the one or more traction control events and environmental factors. In some examples, the controller detects the one or more traction control event by interpreting a signal from a traction control system of the vehicle indicative of a loss of traction.

Further disclosed herein is a vehicle system including an energy storage device, a drive unit including a prime mover to apply regenerative braking to convert mechanical energy into electrical energy during braking to be stored in the energy storage device, a user interface to facilitate a user to provide an input to select an operating mode for the drive unit, where the operating mode is selected from one of selectable modes including: (i) manually controlled regenerative braking mode, and (ii) automatically controlled regenerative braking mode, and a controller coupled with the user interface and the drive unit. The controller can: receive from the user interface the input to determine the operating mode that is selected; responsive to determining that the (i) manually controlled regenerative braking mode is selected, apply a scaling factor to a regenerative torque capability curve for the vehicle system based on additional user input; and responsive to determining that the (ii) automatically controlled regenerative braking mode is selected, automatically apply the scaling factor to the regenerative torque capability curve based on one or more traction control events and environmental factors. The controller can also prevent the drive unit from applying the regenerative braking beyond a regenerative torque limit defined by the regenerative torque capability curve.

In some examples, the selectable modes further includes: (iii) maximum regenerative braking mode and (iv) minimum regenerative braking mode such that the controller can: enable, responsive to determining that the (iii) maximum regenerative braking mode is selected, maximum regenerative torque capability for the vehicle system as defined by a regenerative torque capability curve of the vehicle system; and enable, responsive to determining that the (iv) minimum regenerative braking mode is selected, minimum regenerative torque capability for the vehicle system.

In some examples, the drive unit is coupled with an accelerator pedal and a brake pedal, such that the additional user input includes an actuation of the accelerator pedal and an actuation of the brake pedal by the user. In such examples, responsive to determining that the (i) manually controlled regenerative braking mode is selected, the controller reduces effect of the accelerator pedal actuation in determining the scaling factor, determines the scaling factor based on the brake pedal actuation, and applies the scaling factor to the regenerative torque capability curve of the vehicle. In some examples, the scaling factor corresponds to a position of the brake pedal as determined by a position sensor coupled with the brake pedal. In some examples, the scaling factor is proportional to a force or pressure applied to the brake pedal as determined by a force or pressure sensor coupled with the brake pedal.

In some examples, the minimum regenerative torque capability is defined as when regenerative torque is disabled. In some examples, the scaling factor is selected from a range of from about 5% to about 95%, a range of from about 10% to about 90%, or a range of from about 15% to about 85%. In some examples, responsive to determining that the (ii) automatically controlled regenerative braking mode is selected, the controller implements machine learning to determine the scaling factor based on the one or more traction control events and environmental factors.

In some examples, the system further includes a traction control system coupled with the drive unit. The controller detects the one or more traction control event by interpreting a signal from the traction control system indicative of a loss of traction. In some examples, the system further includes a receiver/transmitter to wirelessly receive and transmit information to and from a remote computing device via a wireless communication system. In some examples, the information includes a calculation algorithm for the scaling factor of the vehicle system.

Also disclosed herein is a method to control the regenerative braking of the vehicle. The method includes: receiving, by a controller from a user interface, an input to determine an operating mode that is selected by a user, the user interface to facilitate the user to provide the input to select the operating mode for the vehicle, the operating mode selected from one of the following selectable modes including: (i) manually controlled regenerative braking mode and (ii) automatically controlled regenerative braking mode; responsive to determining that the (i) manually controlled regenerative braking mode is selected, applying, by the controller, a scaling factor to a regenerative torque capability curve of the vehicle based on additional user input; and responsive to determining that the (ii) automatically controlled regenerative braking mode is selected, automatically applying, by the controller, the scaling factor to the regenerative torque capability curve of the vehicle based on one or more traction control events and environmental factors.

In some examples, the selectable modes further includes (iii) maximum regenerative braking mode and (iv) minimum regenerative braking mode, such that the method further includes: responsive to determining that the (iii) maximum regenerative braking mode is selected, enabling, by the controller, maximum regenerative torque capability for the vehicle as defined by the regenerative torque capability curve of the vehicle; and responsive to determining that the (iv) minimum regenerative braking mode is selected, enabling, by the controller, minimum regenerative torque capability for the vehicle.

In some examples, the additional user input includes accelerator pedal actuation and brake pedal actuation by the user, and the method further includes: responsive to determining that the (i) manually controlled regenerative braking mode is selected, reducing, by the controller, effect of the accelerator pedal actuation in determining the scaling factor; determining, by the controller, the scaling factor based on the brake pedal actuation; and applying, by the controller, the scaling factor to the regenerative torque capability curve of the vehicle.

In some examples, the scaling factor corresponds to a position of a brake pedal as determined by a position sensor coupled with the brake pedal. In some examples, the scaling factor is proportional to a force or pressure applied to a brake pedal as determined by a force or pressure sensor coupled with the brake pedal. In some examples, the minimum regenerative torque capability is defined as when regenerative torque is disabled. In some examples, the scaling factor is selected from a range of from about 5% to about 95%, from about 10% to about 90%, or from about 15% to about 85%. In some examples, the method includes: responsive to determining that the (ii) automatically controlled regenerative braking mode is selected, implementing, for example by the controller, machine learning to determine the scaling factor based on the one or more traction control events and environmental factors. In some examples, the method includes: detecting, for example by the controller, the one or more traction control events by interpreting a signal from a traction control system of the vehicle indicative of a loss of traction.

Also disclosed herein are apparatuses and systems for controlling regenerative braking of a vehicle, including a user interface and a controller. The user interface facilitates a user to provide an input to select an operating mode for the vehicle, the operating mode selected from one of the following selectable modes comprising: (a) maximum regenerative braking mode, (b) minimum regenerative braking mode, (c) manually controlled regenerative braking mode, and (d) automatically controlled regenerative braking mode. The controller is coupled with the user interface and receives from the user interface the input to determine the operating mode that is selected; responsive to determining that the (a) maximum regenerative braking mode is selected, enable maximum regenerative torque capability for the vehicle; responsive to determining that the (b) minimum regenerative braking mode is selected, enable minimum regenerative torque capability for the vehicle; responsive to determining that the (c) manually controlled regenerative braking mode is selected, manually adjust a regenerative torque capability curve of the vehicle based on additional user input; and responsive to determining that the (d) automatically controlled regenerative braking mode is selected, automatically adjust the regenerative torque capability curve of the vehicle based on one or more traction control events or environmental factors.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

Figure 1:
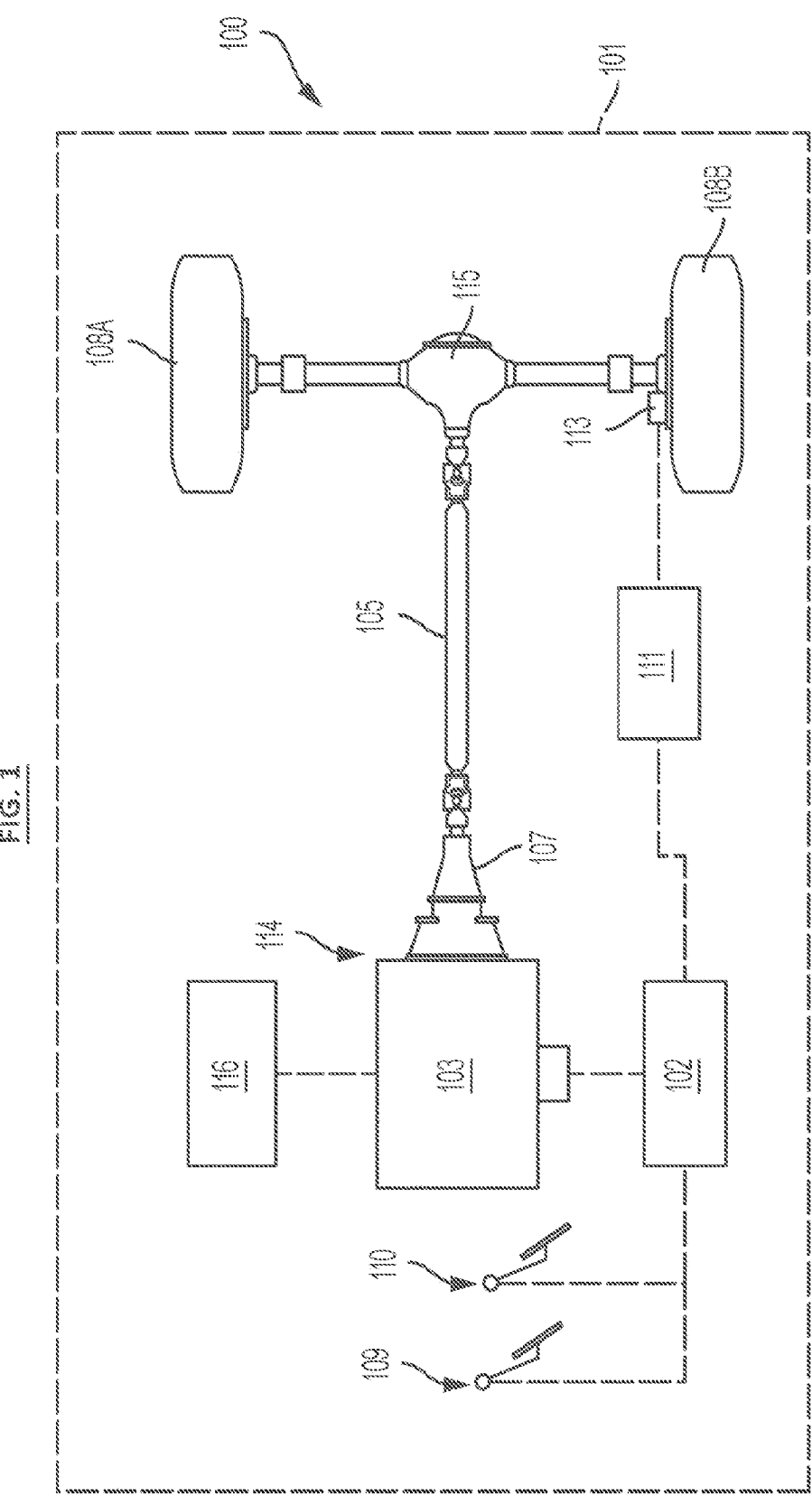
FIG. 1 is a schematic block diagram of a vehicle with a traction control system according to embodiments disclosed herein.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Typically in hybrid or fully electric vehicles, regenerative braking is not fully integrated with friction brakes; that is, the regenerative braking is not activated via actuation of the brake pedal by the driver. Instead, the regenerative braking torque (that is, application of a negative torque on the vehicle caused by regenerative braking) is scheduled at the low end of the accelerator pedal, not at the brake pedal. In the implementation of regenerative braking as known in the art, fully releasing the acceleration pedal by the driver may result in a significant amount of braking torque applied on the vehicle, depending on how the torque commands are implemented. While this may not be a problem in normal driving conditions, it may be dangerous in slick road conditions, for example, in rain, snow, ice, gravel, or sand, in which the simple removal of the driver's foot from the accelerator pedal may result in a loss of traction and triggering of the ABS. Drivers in such instances are left with limited options for managing the range of driving conditions.

In the present disclosure, however, the regenerative braking and the friction brakes are both implemented via the brake pedal such that the initial pressure on the brake pedal may activate only the regenerative braking, whereas the friction brakes are employed only after regenerative braking has reached its capacity, i.e., the amount of torque that is permitted for regenerative braking. This "series braking" approach, so called because of the regenerative braking and the friction brakes being implemented in series with each other, provides added benefits such as improved security during braking, especially in driving conditions that are not optimal.

Referencing FIG. 1, a vehicle system 100 includes a vehicle 101 which may be any suitable type of electric drive vehicle including but not limited to series hybrid and/or battery electric vehicles. The system 100 further includes a powertrain or a drive unit 114 having a prime mover 103. The prime mover 103 may include an internal combustion engine and/or one or more electric devices selectably coupled to a drive shaft 105. The prime mover 103 may be any type of internal combustion engine and/or electric motor known in the art arranged to provide a hybrid powertrain, an electric powertrain, or an internal combustion engine powertrain. In the example of FIG. 1, the prime mover 103 is coupled to the drive shaft 105 through a transmission 107. A differential 115 couples the drive shaft 105 with the wheels 108.

The system 100 further includes an electrical energy storage device 116 that can be connected to prime mover 103. Electrical energy storage device 116 is electrically connected to store electricity generated by the vehicle 101. The electrical energy storage device 116 can be a battery such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any electrical energy storage device 116 is contemplated herein, including a hyper-capacitor and/or an ultra-capacitor.

In certain embodiments, the system 100 includes the drive shaft 105 mechanically coupling the prime mover 103 to two or more vehicle drive wheels 108A and 108B. The system 100 may include any other type of load other than or in addition to drive wheels 108, for example any load that includes stored kinetic energy that may intermittently be slowed by any braking device included in the power train or drive unit 114. An exemplary system 100 includes one or more mechanical braking devices responsive to a mechanical braking command.

An exemplary mechanical braking device includes a compression braking device (not shown), for example a device that adjusts the valve timing of a prime mover that includes an engine such that the engine becomes a torque absorber rather than a torque producer. Another exemplary mechanical braking device includes an exhaust throttle (or exhaust brake) that, in moving toward a closed position, partially blocks an exhaust stream and applies back pressure on the engine resulting in a negative crankshaft torque amount. Yet another exemplary mechanical braking device is a variable geometry turbocharger (VGT) device that can be adjusted to produce back pressure on the engine and provide a braking effect. Still another exemplary mechanical braking device includes a hydraulic retarder. The hydraulic retarder is typically incorporated with the transmission 107. The mechanical braking device may be any braking device which is not the conventional friction brakes of the vehicle 101, and the described examples are not exclusive.

The system 100 further includes torque request devices 109, 110 that provide a torque request value. The torque request device may include a brake pedal 109 (for a negative torque change request) an accelerator pedal 110 (for a positive torque change request). An exemplary torque request device comprises a pedal position sensor for each of the pedals.

System 100 also includes a traction control system 111 connected to one or more wheels 108. Traction control system 111 is configured to detect a traction control event associated with wheels 108. In certain embodiments, the traction control event is a loss of traction determined by, for example, an antilock brake system (ABS) 113 and indicative of a reduced traction surface. For example, the loss of traction can be detected by ABS 113 in response to one or more of wheels 108 slipping on a road surface. A traction control event signal is provided to controller 102 to derate the nominal torque applied by powertrain or drive unit 114 to wheels 108 to reduce slippage in response to the traction control event. Hereinafter, a traction control event is also referred to as an "ABS event" because the existence of such event causes the ABS 113 to respond.

The controller 102 of system 100 may include modules structured to functionally execute operations for managing the torque derate of powertrain or drive unit 114. The controller 102 is linked to the torque request device 109, 110 and the powertrain or drive unit 114. In certain embodiments, the controller 102 forms a portion of a processing subsystem including one or more computing devices having memory, processing, and communication hardware. The controller 102 may be a single device or a distributed device, and the functions of the controller 102 may be performed by hardware or instructions encoded on a computer readable medium.

The electric motor implemented in the motor and drive unit 114 can be used in braking as well in the form of regenerative braking. When the brake pedal is pressed, the motor is treated as a generator to produce negative torque, in which case the produced energy is dissipated or used to chare the energy storage device 116, such as batteries.

Figure 2:
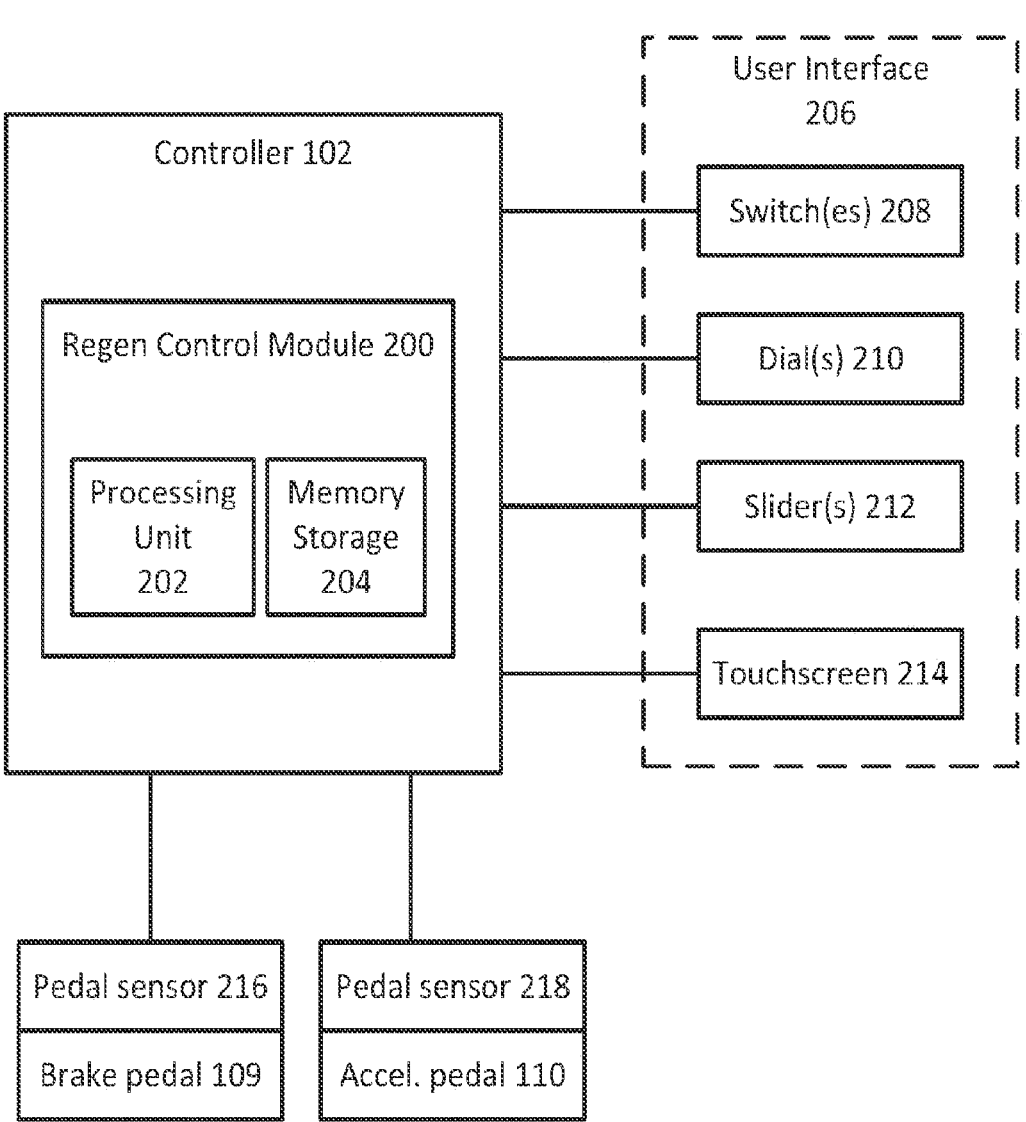
FIG. 2 is a schematic block diagram of a controller implemented with a user interface, according to embodiments disclosed herein.

FIG. 2 illustrates the subcomponents of the controller 102 according to some examples. The controller 102 has regenerative braking control module 200 which includes a processing unit 202 and a memory storage device 204. The processing unit 202 may be any suitable processor, e.g. a central processing unit (CPU), a system on a chip (SoC), or a multi-chip module (MCM), etc., as applicable, and the memory storage device 204 may be any suitable device to hold data regarding programs, instructions, algorithms, and other types of information, to be accessed and executed by the processing unit 202. The memory storage device 204 may be a random-access memory (RAM), read-only memory (ROM), flash memory, or any other types of suitable data storage devices, for example a non-transitory computer-readable medium that stores instructions which, when executed by one or more processors of a computing device, cause the computing device to perform or run any of the methods, computer programs, or algorithms described herein.

In some examples, the controller 102 may further include a receiver/transmitter (not shown) capable of receiving and transmitting data in the form of signals via wired and/or wireless communications. In some examples, the receiver/transmitter allows the controller 102 to access a plurality of external components outside of the vehicle in order to obtain information indicative of environmental factors, such as the weather, terrain, etc. which may affect the road conditions.

The controller 102 is coupled with a user interface 206 either via a wireless connection or wired connection(s). In some examples, the wired connection may include a serial cable, a fiber optic cable, a CAT5 cable, or any other form of wired connection. The wireless connections may include the Internet, Wi-Fi, cellular, radio, Bluetooth, ZigBee, etc. In some examples, a controller area network (CAN) bus provides the exchange of signals, information, and/or data. The CAN bus includes any number of wired and wireless connections. The user interface 206 may include any one or more of the following components: switch(es) 208, dial(s) 210, slider(s) 212, and/or touchscreen 214. The components of the user interface 206 facilitates changing or switching among a plurality of different modes for managing generative braking torque based on the driving conditions, as determined by the driver.

Furthermore, the controller 102 is capable of receiving data inputs from a pedal sensor 216, which is coupled with the brake pedal 109, and a pedal sensor 218, which is coupled with the accelerator pedal 110. The pedal sensors 216, 218 may indicate the position of the pedals with respect to the floor of the vehicle and/or the amount of force or pressure applied to the pedals.

While the term "processor" is briefly defined above, the terms "processor" and "processing unit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server).

Figure 3:
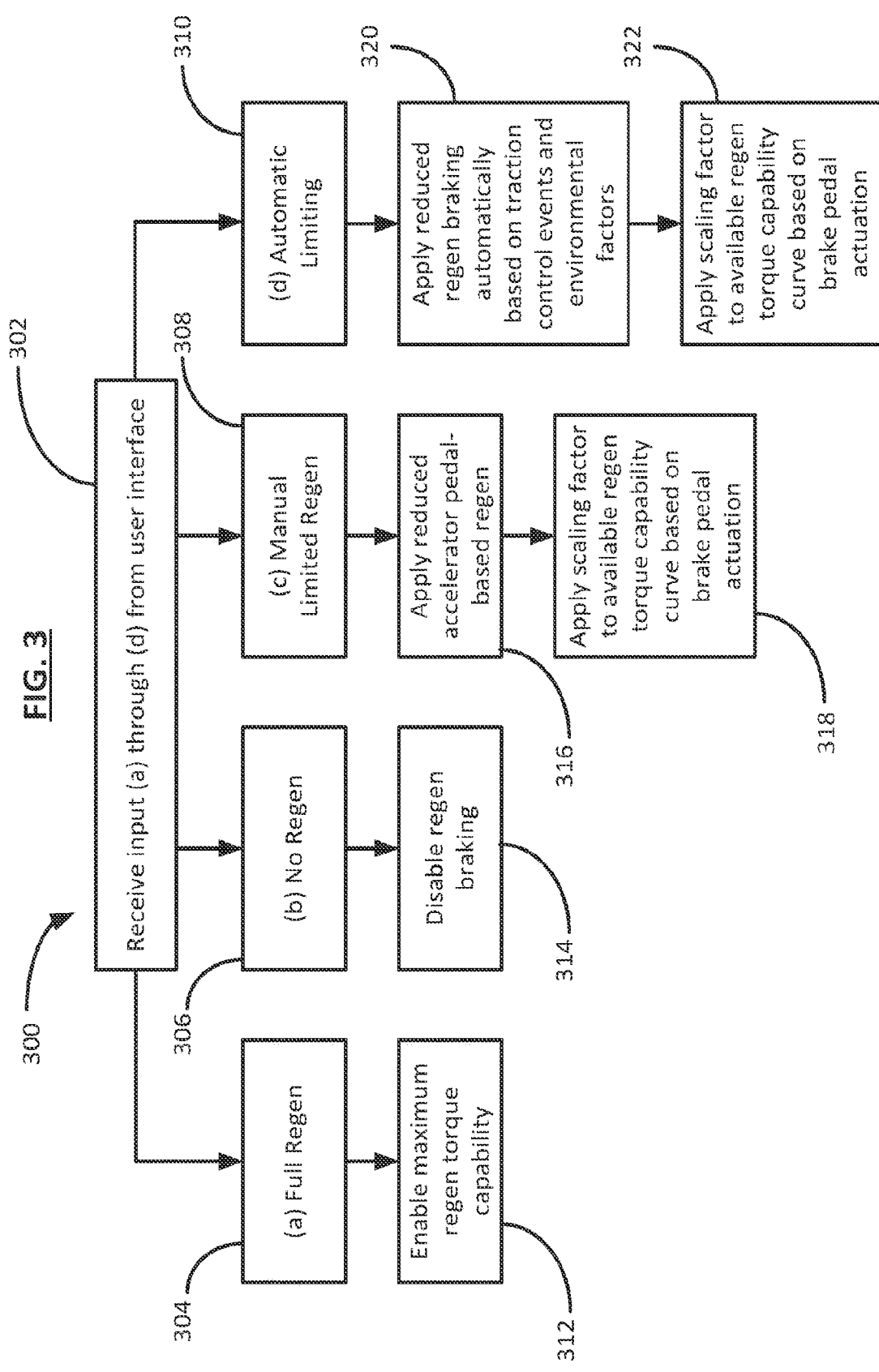
FIG. 3 is a flow diagram of a process for controlling regenerative braking capability of a vehicle according to embodiments disclosed herein.

FIG. 3 shows a flowchart 300 of a process implemented in the regenerative braking control module 200 which solves the aforementioned problem by providing the driver with multiple different modes of operation with regards to regenerative braking in order to control how much of the torque is converted to electrical energy by the drive unit 114. In step 302, the control module receives input from the user interface, where the input is one of four (4) available modes: (a)

"Full Regenerative Braking" mode 304, (b) "No Regenerative Braking" mode 306, (c) "Manually Controlled Limited Regenerative Braking" mode 308, and (d) "Automatically Controlled Limited Regenerative Braking" mode 310. The characteristics of each of the modes 304, 306, 308, and 310 are explained herein.

In the first mode 304, also referred to as a maximum regenerative braking mode, the maximum regenerative torque capability is enabled such that the full regenerative braking (as defined by the regenerative torque capability curve of the vehicle) is available with no derating or alteration, as shown in step 312. This mode is recommended in safe and dry driving conditions or if the driver is willing to accept all responsibility for managing the vehicle on any road surface that may be encountered.

In the second mode 306, also referred to as a minimum regenerative braking mode, the regenerative braking is either disabled or reduced to the minimum threshold (or minimum regenerative torque capability) to provide minimal risk on surfaces that are deemed slippery or otherwise too dangerous for regenerative braking, as shown in step 314. This mode is recommended for poor road surface conditions, for example roads with glare ice. In such conditions, any regenerative braking may upset the balance between the front and rear braking that is designed to maintain stability of the vehicle, so the driver may decide to deactivate regenerative braking entirely. In some examples, the minimum regenerative torque capability may be defined as when a regenerative torque is disabled entirely.

However, the first two modes 304 and 306 alone may not be suitable for drivers who may forget to switch modes when the driving condition improves or worsens, thereby harming the fuel economy in a hybrid electric vehicle or the vehicle range in an all-electric vehicle. In such cases, the third and fourth modes 308 and 310 are introduced to provide additional controls regarding the regenerative braking settings.

In the third mode 308, the maximum regenerative braking limit may be set between the first mode 304 and the second mode 306 as manually activated by the driver. For example, in step 316, the control module applies a reduced accelerator pedal-based regenerative braking. That is, the actuation of the accelerator pedal has a reduced effect on the maximum regenerative braking limit. In some examples, the effect is reduced such that the actuation of the accelerator pedal has no effect on the regenerative braking limit. The maximum regenerative braking limit may be determined by an available regenerative torque capability for the vehicle, which may be adjusted, such as via the application of a scaling factor or multiplication factor. The regenerative torque capability may be manually adjusted based on additional user input, which may be a user-specified/predetermined regenerative braking limit, for example. In step 318, the available regenerative torque capability curve is adjusted, for example by applying a scaling factor to the available regenerative torque capability curve, based on user input, such as the brake pedal actuation. The amount of the scaling factor, therefore, may be dependent upon the position of the brake pedal such that the driver can flexibly and dynamically control or "relax" the braking derate limits by applying the brake pedal. This mode is recommended when the road condition may be somewhat risky, for example a slick road surface causing a reduced traction.

In the fourth mode 310, the reduced regenerative braking may be automatically applied by the control module based on the traction control events and the environmental factors as previously mentioned, as shown in step 320, using any suitable derating algorithm. In some examples, the algorithm may implement machine learning to learn the appropriate regenerative braking control such as derate levels in different road conditions. In some examples, the regenerative torque capability curve may be automatically adjusted, for example by applying a scaling factor, based on one or more traction control events or environmental factors. In step 322, the available regenerative torque capability curve is adjusted, for example by applying the scaling factor to the available regenerative torque capability curve, based on the brake pedal actuation. The controller may detect the traction control events by interpreting a signal from a traction control system of the vehicle indicative of a loss of traction.

In the fourth mode 310, the full regenerative braking is available but the control module is also able to automatically respond to any ABS events and impose a sustaining derate in response to detecting such events. However, such derates may be temporary, and any such sustained derates may be disabled and erased from the control module upon receiving an indication that the driver is switching to another mode. This mode is recommended when the road condition may be somewhat risky, for example a slick road surface causing a reduced traction, and the driver wishes to let the system automatically adjust the best braking level for such conditions. Although there are four modes shown, other additional modes may be implemented, for example to implement modes with different ranges of regenerative braking torque values. Furthermore, in some examples, the user may be able to select only between the third mode 308 and the fourth mode 310. In some examples, different user interfaces may be used to switch between selecting the first mode 304 or the second mode 306 and selecting the third mode 308 or the fourth mode 310.

Figure 4:
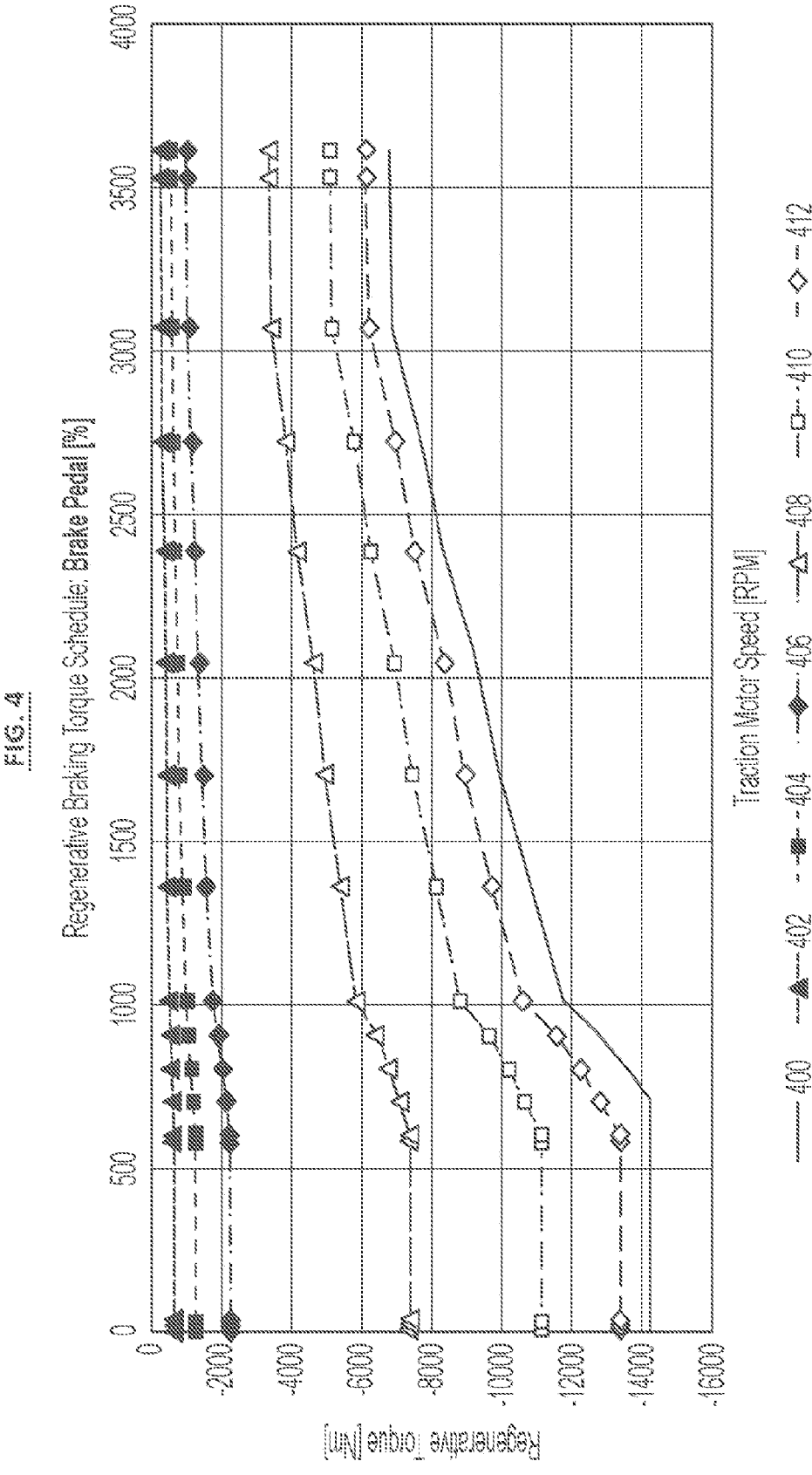
FIG. 4 is a graph of different regenerative torque capability curves as determined by brake pedal actuation according to embodiments disclosed herein.

FIG. 4 illustrates an example of how the scaling factor may affect an available regenerative torque capability curve when applied in steps 318 and 322. The original available regenerative torque capability curve 400 is the curve that determines the maximum regenerative torque capability or the regenerative torque limit (shown in Nm) for different traction motor speeds (shown in RPM). As such, for each value of traction motor speed, the regenerative torque capability may not exceed the value that is determined by the curve. The curve 400 may be predetermined or predefined based on the type of drive unit implemented in the vehicle. In some examples, the curve 400 may be stored in the memory of the controller to be accessed by the processor, such as in a lookup table. In some examples, the controller operatively coupled with the drive unit may prevent the drive unit from applying the regenerative braking beyond a regenerative torque limit defined by the regenerative torque capability curve 400.

In the example shown, there are six (6) curves based on the original curve 400 having different scaling factors applied thereto, although the number of curves may vary in other examples. The first curve 402 has the smallest scaling factor, and the small scaling factor is based on the limited actuation of the brake pedal by the driver. That is, the driver is only applying a light brake in this example, therefore the curve 402 permits a minimal amount of regenerative braking. In comparison, the second, third, fourth, and fifth curves (404, 406, 408, and 410 respectively) have increasingly greater brake pedal actuation than the first curve 402, with the sixth curve 412 having the greatest brake pedal actuation.

In some examples, the sixth curve 412 represents the greatest scaling factor that can be achieved in the third mode 308 and the fourth mode 310. That is, the scaling factor may be any value between 0% and 100% but not including the values 0% and 100%, because 100% scaling factor, which enables the maximum regenerative braking limit, is achievable only in the first mode 304 ("Full Regenerative Braking" mode) and 0% scaling factor, which disables the regenerative braking, is achievable only in the second mode 306 ("No Regenerative Braking" mode). In some examples, the range of possible scaling factors may extend from about 5% to about 95%, from about 10% to about 90%, from about 15% to about 85%, from about 20% to about 80%, or any suitable range therein or therebetween. The amount of braking torque which surpasses the allowed regenerative braking torque threshold as defined by the curve is accommodated by friction braking which works in series with the regenerative braking.

FIG. 4 is provided for illustrative purposes only and does not intend to limit the scopes of the disclosure. As an example, the percentages of brake pedal actuation for each of the curves may be implemented as follows: curve 402 represents 10% brake pedal actuation, curve 404 represents 15% brake pedal actuation, curve 406 represents 20% brake pedal actuation, curve 408 represents 25% brake pedal actuation, curve 410 represents 30% brake pedal actuation, and curve 412 represents 40% brake pedal actuation. However, any other values for the percentages may be implemented as appropriate, and the intervals as well as the shapes of the original available regenerative torque curve 400 may vary depending on the type of vehicle, for example.

Figure 5:
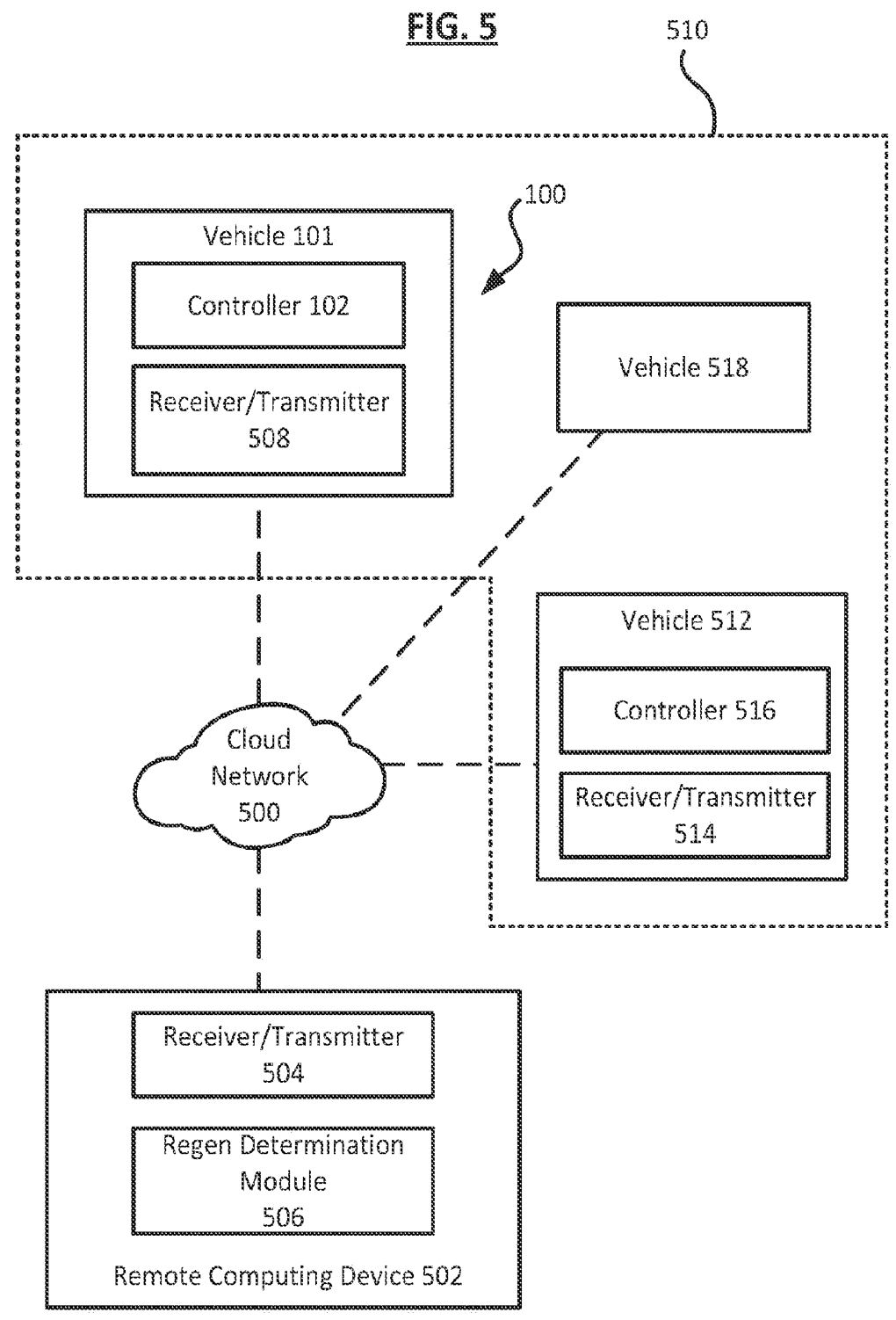
FIG. 5 is a schematic block diagram of a vehicle system (or a vehicle fleet system) implemented in a cloud network according to embodiments disclosed herein.

In some examples, as shown in FIG. 5, the vehicle system 100 may not be limited to just the vehicle 101 and its onboard components as shown in FIG. 1. For example, a cloud network 500 may be implemented to wirelessly couple the vehicle 101 with a remote computing device 502 which performs the calculations necessary for the (d) "Automatically Controlled Limited Regenerative Braking" mode 310 as previously mentioned. That is, the cloud network 500 may provide the vehicle 101 with the additional processing capability by coupling the controller 102 of the vehicle 101 with the remote computing device 502. The device 502 may include processor(s), server(s), or any other suitable computing devices.

The device 502 has a regenerative braking determination module 506 which performs the calculations for the (d) "Automatically Controlled Limited Regenerative Braking" mode 310, including but not limited to machine learning. The device 502 also has a receiver/transmitter 504 to receive information from vehicle sensors and to transmit information (such as the results of the aforementioned calculations) back to the vehicle 101. Similarly, the vehicle 101 also has a receiver/transmitter 508 to transmit sensor measurements and receive the calculation results from the remote computing device 502.

Therefore, in some examples implementing the cloud network 500 as explained above, the on-board regenerative braking control module 200 in the controller 102 of the vehicle 101 may have limited data processing capability to handle only the (a) "Full Regenerative Braking" mode 304, (b) "No Regenerative Braking" mode 306, and (c) "Manually Controlled Limited Regenerative Braking" mode 308. In response to determining that the driver has selected one of these modes (a) through (c), the control module 200 may automatically disconnect the vehicle 101 from the cloud network 500 temporarily in order to reduce the amount of data transmission therein, and then automatically reconnect to the network 500 when the (d) "Automatically Controlled Limited Regenerative Braking" mode 310 is selected by the driver. In some examples, the control module 200 may also determine to connect to the cloud network 500 to obtain any data necessary for the (c) "Manually Controlled Limited Regenerative Braking" mode 308, such as the regenerative torque capability curve for the vehicle 101.

In some examples, the cloud network 500 couples the remote computing device 502 with a fleet 510 of vehicles including not only the vehicle 101 but also an additional vehicle 512, which includes its own receiver/transmitter 514 and controller 516, and in some examples one or more additional vehicle(s) 518. A calculation algorithm for the scaling factor that is implemented for regenerative braking may vary depending on the type and/or model of the individual vehicles, in which case the calculation algorithm for determining the scaling factor for the regenerative torque capability curve is transmitted separately for each vehicle in the fleet 510 such that different vehicles may have different scaling factors even when the same user input (e.g., brake pedal actuation) is applied. For example, in some vehicles, the scaling factor is applied linearly, i.e. the user input is directly proportional to the value of scaling factor that is applied, while in some vehicles, the scaling factor is applied non-linearly, in which case the user input such as the brake pedal actuation does not proportionally translate to the determined scaling factor. In some examples, the information transmitted by the receiver/transmitter may include the calculation algorithm for the scaling factor.

Advantages of implementing the driver-selectable multi-mode regenerative braking system includes the benefit of real-time adjustment of regenerative braking control based on the driver's preference. For example, the driver may determine the regenerative braking mode that is the safest based on the current driving environments, or otherwise rely on the automatic adjustment of regenerative braking based on the traction control events and environmental factors. Providing additional options for the driver to select from not only increase the user satisfaction of the system but also allows for versatility with respect to different drivers using the vehicle to operate in the mode that they are most accustomed to, thereby leading to increased safety and stability of the vehicle operation.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method of controlling regenerative braking of a vehicle, the method comprising:

receiving, by a controller from a user interface, an input associated with an operating mode that is selected by a user, the user interface configured to facilitate the user to provide the input to select the operating mode for the vehicle, the operating mode selected from one of selectable modes comprising: (i) manually controlled regenerative braking mode and (ii) automatically controlled regenerative braking mode;

responsive to selecting the (i) manually controlled regenerative braking mode, applying, by the controller, a scaling factor to a regenerative torque capability curve of the vehicle based on an additional user input; and responsive to selecting the (ii) automatically controlled regenerative braking mode, automatically applying, by the controller, the scaling factor to the regenerative torque capability curve of the vehicle based on one or more traction control events and environmental factors.

2. The method of claim 1, the selectable modes further comprising (iii) maximum regenerative braking mode and (iv) minimum regenerative braking mode, the method further comprising:

responsive to selecting the (iii) maximum regenerative braking mode, enabling, by the controller, maximum regenerative torque capability for the vehicle as defined by the regenerative torque capability curve of the vehicle; and responsive to selecting the (iv) minimum regenerative braking mode, enabling, by the controller, minimum regenerative torque capability for the vehicle.

3. The method of claim 2, wherein the minimum regenerative torque capability is defined as when regenerative torque is disabled.

4. The method of claim 1, wherein the additional user input comprises accelerator pedal actuation and brake pedal actuation by the user.

5. The method of claim 4, further comprising:

responsive to selecting the (i) manually controlled regenerative braking mode, reducing, by the controller, effect of the accelerator pedal actuation in calculating the scaling factor;

calculating, by the controller, the scaling factor based on the brake pedal actuation; and applying, by the controller, the scaling factor to the regenerative torque capability curve of the vehicle.

6. The method of claim 5, wherein the scaling factor corresponds to a position of a brake pedal based on a position sensor coupled with the brake pedal, or the scaling factor is proportional to a force or pressure applied to the brake pedal based on a force or pressure sensor coupled with the brake pedal.

7. The method of claim 1, wherein the scaling factor is selected from a range of from 5% to 95%, from 10% to 90%, or from 15% to 85%.

8. The method of claim 1, further comprising: responsive to selecting the (ii) automatically controlled regenerative braking mode, implementing machine learning to calculate the scaling factor based on the one or more traction control events and environmental factors.

9. The method of claim 1, further comprising: detecting the one or more traction control events by interpreting a signal from a traction control system of the vehicle indicative of a loss of traction.

10. An apparatus for controlling regenerative braking of a vehicle, the apparatus comprising:

a user interface configured to facilitate a user to provide an input to select an operating mode for the vehicle; and a controller coupled with the user interface, the controller configured to:

receive from the user interface the input associated with the operating mode, the operating mode selected from one of selectable modes comprising: (i) manually controlled regenerative braking mode and (ii) automatically rolled regenerative braking mode;

responsive to selecting the (i) manually controlled regenerative braking mode, apply a scaling factor to a regenerative torque capability curve of the vehicle based on an additional user input; and responsive to selecting the (ii) automatically controlled regenerative braking mode, automatically apply the scaling factor to the regenerative torque capability curve of the vehicle based on one or more traction control events and environmental factors.

11. The apparatus of claim 10, the selectable modes further comprising (iii) maximum regenerative braking mode and (iv) minimum regenerative braking mode, the controller further configured to:

responsive to selecting the (iii) maximum regenerative braking mode, enable maximum regenerative torque capability for the vehicle as defined by the regenerative torque capability curve of the vehicle; and responsive to selecting the (iv) minimum regenerative braking mode, enable minimum regenerative torque capability for the vehicle.

12. The apparatus of claim 10, wherein the additional user input comprises accelerator pedal actuation and brake pedal actuation by the user.

13. The apparatus of claim 12, the controller further configured to:

responsive to selecting the (i) manually controlled regenerative braking mode, reduce an effect of the accelerator pedal actuation in calculating the scaling factor;

calculate the scaling factor based on the brake pedal actuation; and apply the scaling factor to the regenerative torque capability curve of the vehicle.

14. A vehicle system comprising:

an energy storage device;

a drive unit comprising a prime mover configured to apply regenerative braking to convert mechanical energy into electrical energy during braking to be stored in the energy storage device; and an apparatus for controlling the regenerative braking of the vehicle system, the apparatus comprising:

a user interface configured to facilitate a user to provide an input to select an operating mode for the vehicle system; and a controller coupled with the user interface, the controller configured to:

receive from the user interface the input associated with the operating node, the operating mode selected from one of selectable modes comprising: (i) manually controlled regenerative braking mode and (ii) automatically controlled regenerative braking mode;

responsive to selecting the (i) manually controlled regenerative braking mode, apply a scaling factor to a regenerative torque capability curve of the vehicle system based on an additional user input; and responsive to selecting the (ii) automatically controlled generative braking mode, automatically apply the scaling factor to the regenerative torque capability curve of the vehicle system based on one or more traction control events and environmental factors.

15. The vehicle system of claim 14, wherein the controller is operatively coupled with the drive unit and is configured to prevent the drive unit from applying the regenerative braking beyond a regenerative torque limit defined by the regenerative torque capability curve.

16. The vehicle system of claim 14, further comprising a receiver/transmitter configured to wirelessly receive and transmit information to and from a remote computing device via a wireless communication system.

17. The vehicle system of claim 16, wherein the information includes a calculation algorithm for the scaling factor of the vehicle system.

18. The vehicle system of claim 14, the selectable modes further comprising (iii) maximum regenerative braking mode and (iv) minimum regenerative braking mode, the controller further configured to:

responsive to selecting the (iii) maximum regenerative braking mode, enable maximum regenerative torque capability for the vehicle system as defined by the regenerative torque capability curve of the vehicle system; and responsive to selecting the (iv) minimum regenerative braking mode, enable minimum regenerative torque capability for the vehicle system.

19. The vehicle system of claim 14, further comprising an accelerator pedal and a brake pedal associated with the drive unit, wherein the additional user input comprises an actuation of the accelerator pedal or the brake pedal by the user.

20. An apparatus for controlling regenerative braking of a vehicle, the apparatus comprising:

a user interface configured to facilitate a user to provide an input to select an operating mode for the vehicle, the operating mode selected from one of the following selectable modes comprising: (a) maximum regenerative braking mode, (b) minimum regenerative braking mode, (c) manually controlled regenerative braking mode, and (d) automatically controlled regenerative braking mode; and a controller coupled with the user interface, the controller configured to:

receive from the user interface the input associated with the operating mode that is selected;

responsive to selecting the (a) maximum regenerative braking mode, enable maximum regenerative torque capability for the vehicle;

responsive to selecting the (b) minimum regenerative braking mode, enable minimum regenerative torque capability for the vehicle;

responsive to selecting the (c) manually controlled regenerative braking mode, manually adjust a regenerative torque capability curve of the vehicle based on an additional user input; and responsive to selecting the (d) automatically controlled regenerative braking mode, automatically adjust the regenerative torque capability curve of the vehicle based on one or more traction control events or environmental factors.

* * * * *